United States Patent
Buwalda et al.

(10) Patent No.: US 8,697,170 B2
(45) Date of Patent: Apr. 15, 2014

(54) STARCH COMPOSITION AND METHOD TO PRODUCE A BAKED PRODUCT

(75) Inventors: Pieter Lykle Buwalda, Groningen (NL); Vincentius Henrichus Johannes Melenhorst, Zenderen (NL); José Mastenbroek, The Hague (NL)

(73) Assignee: DSM IP Assets B.V., Heerlen (NL)

( * ) Notice: Subject to any disclaimer, the term of this patent is extended or adjusted under 35 U.S.C. 154(b) by 28 days.

(21) Appl. No.: 13/057,608

(22) PCT Filed: Jul. 29, 2009

(86) PCT No.: PCT/EP2009/059800
§ 371 (c)(1),
(2), (4) Date: Feb. 4, 2011

(87) PCT Pub. No.: WO2010/015554
PCT Pub. Date: Feb. 11, 2010

(65) Prior Publication Data
US 2011/0142994 A1    Jun. 16, 2011

(30) Foreign Application Priority Data
Aug. 5, 2008  (EP) .................... 08161829

(51) Int. Cl.
| | | |
|---|---|---|
| *A23L 1/05* | (2006.01) | |
| *A21D 10/00* | (2006.01) | |
| *A21D 13/00* | (2006.01) | |
| *A23L 1/28* | (2006.01) | |
| *A23C 9/12* | (2006.01) | |
| *A23G 3/00* | (2006.01) | |

(52) U.S. Cl.
USPC ............. 426/578; 426/62; 426/549; 426/660; 426/661; 435/97; 435/101

(58) Field of Classification Search
USPC .................................. 426/62, 660
See application file for complete search history.

(56) References Cited

U.S. PATENT DOCUMENTS

| 2010/0029928 A1 | 2/2010 | De Vries et al. |
| 2010/0143542 A1 | 6/2010 | Buwalda et al. |

FOREIGN PATENT DOCUMENTS

| EP | 0 799 837 | 10/1997 |
| WO | WO 98/15347 | 4/1998 |
| WO | WO 03/002728 | 1/2003 |

OTHER PUBLICATIONS

Exploring and Exploiting Starch-modifying Amylomaltases from Thermophiles. Biochemical Society Transactions (2004) vol. 32, part 2 pp. 279-282.*
Understanding Starch Funtionality. Available on line at www.foodproductdesign.com, posted on Jan. 1, 1996.*
A Novel Thermoreversible Gelling Product Made by Enzymatic Modification of Starch. Starch 57 (2005) pp. 465-472.*
Harkema., Starch-Derived Fat Mimet5ics from Potato. Chapter 6B from "Handbook of Fat Replacers" (1996).*
Van Der Maarel, M.J.EC et al., "Amylomaltase from the Hyperthermophilic Bacterium *Thermus thermophilus*: Enzyme Characteristics and Application in the Starch Industry", Mededelingen—Faculteit Landbouwkundige En Toegepastebiologische Wetenschappen Universiteit Gent, (Jan. 1, 2000), pp. 231-234.

* cited by examiner

*Primary Examiner* — Rena Dye
*Assistant Examiner* — Assaf Zilbering
(74) *Attorney, Agent, or Firm* — Miles & Stockbridge, P.C.

(57) ABSTRACT

The invention relates to a novel starch composition comprising: (a) amylomaltase-treated starch; (b) amylopectin starch; and (c) optionally, low DE maltodextrin. In addition, the invention relates to the use of the novel starch composition to produce a baked product, optionally thereby reducing the amount of fat needed for the recipe.

20 Claims, No Drawings

STARCH COMPOSITION AND METHOD TO PRODUCE A BAKED PRODUCT

This application is the U.S. national phase of International Application No. PCT/EP2009/059800, filed 29 Jul. 2009, which designated the U.S. and claims priority to EP Application No. 08161829.0, filed 5 Aug. 2008, the entire contents of each of which are hereby incorporated by reference.

FIELD OF THE INVENTION

This invention relates to a novel starch composition, a method to produce a baked product, for example cake, with this novel composition and the cake produced with this novel method.

BACKGROUND OF THE INVENTION

Cake is known for a long time and is prepared in numerous varieties. Most cakes are made with wheat flour and therefore have some amount of gluten, which means special care needs to be taken to ensure cakes don't have a chewy texture. The cake ingredients are mixed as short as possible once the flour has been added in order to avoid gluten development. This differs markedly from sturdy food items made with flour such as bread, where the goal is to agitate the gluten as much as possible. The wheat flour selected to be used for cakes is often one naturally lower in gluten or with gluten that does not develop elasticity.

Typical cake ingredients are wheat flour, eggs and sugar. Optionally, chemical leavening agents, milk components, emulsifiers, salts, stabilizers, water, and/or fat—such as for example butter, margarine and or oil are added.

The fat is added to entrap air during mixing, for lubrication to improve the overall eating quality in terms of moistness and tenderness, to improve the structure of the finished product, and/or to extend shelf life. Next to the beneficial effects of fat in cake, there are some disadvantages related to the use of these ingredients.

The fat content in some types of cake can be very high, such as for example the butter/margarine present in pound cake. This type of cake is a calorie booster, which can cause obesity. Today's consumers in modern societies are confronted with an imbalance between calorie-intake and physical exercise. Therefore a growing percentage of the population is overweight and more and more people become obese. According to WHO figures (2003) 1 billion adults are overweight and 300 million are clinically obese. Obesity is connected to a broad spectrum of diseases such as cardio-vascular diseases, type 2 diabetes, etc. Therefore a growing need is obvious to reduce the intake of calories by replacing fat, sugar and other high calorie components of food products, such as for example cakes.

Moreover, in a number of cake recipes fats with a relatively high amount of saturated fatty acids are used, which contribute to the melting characteristics of the product. However, the intake of such saturated fatty acids is also directly correlated with the occurrence of cardiovascular health diseases. For example a typical pound cake contains per 100 gram cake, about 24 gram fat, of which about 8 gram saturated fat (http://www.caloriechecker.nl, 2008). A reduction in intake of saturated fatty acids is therefore also desired.

One solution to this problem is to remove (part of) the fat in the recipe. However, in case part of the fat is removed from the recipe the batter becomes less viscous and in some cases less stable. The baked cake has less volume, a more dense structure and the mouthfeel is much drier and crumbly. When replaced with moisture a sticky, "not done" texture is obtained It is an object of the present invention to improve desired cake properties such as e.g. texture and mouthfeel in regular cakes. It is another object of the present invention to enable reduction of the amount of fat in cake recipes, whilst at least maintaining desired cake properties, such as textural properties and mouthfeel.

The action of starch and derivatives as a fat replacer is well known. For instance in U.S. Pat. No. 4,510,166 the fat mimetic properties of alpha amylase degraded starches are described. In U.S. Pat. No. 5,711,986 fat replacement is achieved employing debranched starches. In patent WO 2008071744 fat replacement in dairy using amylomaltase treated starch is described. However, fat replacement using starch derivatives is by no means straight forward and easy. Functionality requirements on fat and hence the fat replacers differ significantly from food item to food item. The replacement of fat in that given item is often unpredictable and a matter of trial and error (see for instance: "Fat Substitute Update," Food Technology March, 1990, pp 92-97).

DESCRIPTION OF THE INVENTION

Surprisingly it has now been found that the object of the invention can be attained by using a novel starch composition. The novel starch composition according to the invention can for example be used in a method to produce cake. The starch composition according to the invention comprises:
(a) amylomaltase-treated starch;
(b) amylopectin starch; and
(c) optionally, low DE maltodextrin.

The present invention also relates to a method to produce a starch composition comprising mixing
a. amylomaltase-treated starch (component (a));
b. amylopectin starch (component (b)); and
c. optionally, low DE maltodextrin (component (c))
to form the starch composition.

A suitable amylomaltase-treated starch is disclosed in EP0932444 which is enclosed herein by reference. In EP0932444 the production of alpha 1-4, alpha 1-4 glucanotransferase (alpha 1-4, alpha 1-4 glucosyltransferase, amylomaltase or EC 2.4.1.25) as well as the action of an enzyme having alpha 1-4, alpha 1-4 glucosyltransferase activity on starch are described. "Alpha 1-4, alpha 1-4 glucanotransferase", "Alpha 1-4, alpha 1-4 glucosyltransferase" and "amylomaltase" will be interchangeably used in this text. This enzyme does not degrade the starch, but reattaches the amylose onto the amylopectin.

The resulting product forms gels above 3% (w/w) solutions in water. These gels, although particulate in nature, have a texture normally connected to gums and other hydrocolloids and are different from gels of acid- or amylase-degraded or debranched starch products. The gels of amylomaltase-treated starch are thermo-reversible at approximately 70° C. "Amylomaltase treated starch", "amylomaltase converted starch" and "amylomaltase modified starch" will be interchangeably used in this text, meaning that the starch is modified by amylomaltase activity. Preferably the enzymatic conversion (or modification or treatment) can be followed by means of reduction of the viscosity when the conversion takes place at 60-75° C. After the desired viscosity reduction has been reached, the conversion can be halted (see EP0932444). Advantageously, the amylomaltase treated starch is not treated with a debranching enzyme. The treatment of a debranching enzyme would result in a starch product that would comprise amylase fragments, whereas the present amylomaltase treated starch does not comprises amylase fragments formed by an added debranching enzyme activity.

An example of the production of amylomaltase treated starch is described in EP0932444. The amylomaltase treated starch can be prepared from suspension of potato starch in water (19-20% w/w). This suspension is jet-cooked at 150-160° C. in order to dissolve the starch. The product is cooled in vacuo to 70° C. Flash cooling is a preferred option. The pH is adjusted to 6.2 using for example 6N $H_2SO_4$. Then amylomaltase (2 ATU/g starch) was added. The solution was stirred for 2 to 20 hr at 70° C. Then the solution was jet-cooked at 130° C. for a short time, for example 1 to 20 seconds and spray dried using for example a model Compact spray dryer (Anhydro, Danmark).

The amylomaltase-treated starch (component (a)) can be produced from any kind of amylose containing starch. It can be for example potato starch, maize starch, wheat starch, rice starch or tapioca starch. It is understood that amylomaltase treatment of a blend of a high amylose starch with a high amylopectine is part of the present invention. It can also be produced from starches that are referred to as high amylose starches. Well known examples are leguminose starches such as mung bean starch, pea starch, high amylose corn starch, wrinkeled pea starch. Moreover starches with elevated amylose levels are known from genetically modified plants such as potato. Preferably the starch is potato starch. An example of a suitable amylomaltase-treated potato starch is Etenia™ (Avebe, Holland).

Preferably, the composition according to the invention comprises at least 5 wt % amylomaltase-treated starch (whereby the wt % is based on the total dry matter weight of components (a), (b) and (c)). More preferably, the invention comprises at least 7 or 10 wt % amylomaltase-treated starch. In general, the composition according to the invention comprises at most 90 wt % amylomaltase-treated starch. Preferably, the composition according to the invention comprises at most 80, at most 70, at most 60 or at most 50 wt % amylomaltase-treated starch. More preferably, the composition according to the invention comprises at most 30 wt % amylomaltase-treated starch and most preferably at most 20 wt % amylomaltase-treated starch. Herein wt % with respect to components (a), (b), and (c) is wt % in relation to the total weight of components (a), (b), and (c). In case additional components are added, for example component (d), the total weight of components (a), (b), (c) and (d) will be higher than 100%. The wt % of the additional components such as component (d), will be given relative to the total weight of components (a), (b), and (c).

The amylopectin starch (component (b)) can be derived from well known sources such as waxy maize, waxy rice, waxy barley, waxy sorghum, waxy wheat and waxy varieties of root and tuber starches such as those of tapioca and potato.

Amylopectin consists of very large, highly branched molecules having an average degree of polymerization of 1,000,000 or more. The commercially most important starch types, namely maize starch, potato starch, wheat starch and tapioca starch, contain 15 to 30 wt % amylose. The amylopectin starch according to the invention is defined herein as an amylopectin starch containing at least 95% of amylopectin.

The amylopectin starch is preferably obtained from root or tuber starches. Potato starch granules isolated from potato tubers usually contain about 20% amylose and 80% amylopectin (wt % on dry substance). However, potato plant species are known which were cultivated whereby the expression of the coding genes for the enzyme granule-bound starch synthase (GBSS) was eliminated or inhibited. This resulted in prevention or limited synthesis of the GBSS enzyme, whereby in the potato tubers starch granules are formed consisting more than 95 wt % (on dry substance) of amylopectin. Elimination or inhibition of the expression of these specific genes results in the production of the GBSS enzyme being prevented or limited. The elimination of these genes can be realized by genetic modification of potato plant material, as described in patent EP0799837B1, or by recessive mutation. An example thereof is the amylose-free mutant of the potato (amf) of which the starch substantially only contains amylopectin through a recessive mutation in the GBSS gene. This mutation technique is described in, inter alia, J. H. M. Hovenkamp-Hermelink et al., "Isolation of amylose-free starch mutant of the potato (*Solanum. tuberosum* L.)", Theor. Appl. Gent., (1987), 75:217-221" and E. Jacobsen et. al., "Introduction of an amylose-free (amf), mutant-into breeding of cultivated potato, *Solanum tuberosum* L., Euphytica, (1991): 53:247-253. In a preferred embodiment of the invention the amylopectin starch is obtained from potato tubers containing starch granules consisting more than 95 wt % (on dry substance) of amylopectin. In contrast to waxy cereal starches, amylopectin-potato starch contains chemically bound phosphate groups, which gives specific characteristics to the products.

Other options for the production of amylopectin starch are separation or modification of the amylose in the starch by chemical, physical or enzymatic treatment.

In an even more preferred embodiment of the present invention, the amylopectin starch is pregelatinized (cold swellable). The person skilled in the art knows how to pregelatinize starch.

It is understood that minor modification such as esterification, etherification, crosslinking, degradation, etc. well known to the artesian are incorporated into present invention.

Examples of suitable amylopectin potato starch are the Eliane starches from Avebe, The Netherlands, such as for example Eliane™ C100, Eliane™ EZ 100 and Eliane™ 100.

Preferably, the composition according to the invention comprises at least 10 wt % amylopectin starch (whereby the wt % is based on the total dry matter weight of components (a), (b) and (c)). More preferably, the composition according to the invention comprises at least 30, at least 40 or at least 50 wt % amylopectin starch. Preferably, the composition according to the invention comprises at most 95 wt % amylopectin starch. More preferably the composition according to the invention comprises at most 93 wt % amylopectin starch. Even more preferably, the composition according to the invention comprises at most 90 wt % amylopectin starch. Most preferably, the composition according to the invention comprises at most 85, at most 80, at most 70 or at most 60 wt % of the amylopectin starch.

Optionally, the composition according to the invention can contain low DE maltodextrins (component (c)). Dextrose equivalent (DE) is defined as the percentage of reducing sugar in a syrup calculated as dextrose on a dry weight basis. The low DE maltodextrin can be any low DE maltodextrin, preferably having a DE between 0.1 and 10, more preferably between 1 and 8. An example of a suitable low DE maltodextrin is Paselli SA2 (Avebe, Holland).

Preferably, the composition according to the invention comprises at least 1 wt % low DE maltodextrin (whereby the wt % is based on the total dry matter weight of components (a), (b) and (c)). More preferably, the composition according to the invention comprises at least 1.5, at least 4 or at least 6 wt % low DE maltodextrin. Preferably, the composition according to the invention comprises at most 60 wt % low DE maltodextrin. More preferably the composition according to the invention comprises at most 50 wt % low DE maltodextrin. Most preferably, the composition according to the invention comprises at most 40, at most 30, at most 20 or at most 10 wt % of the low DE maltodextrin.

The use of maltodextrin can improve the water containing capability of the cake, without making the cake soggy. Additionally, by adding the low DE maltodextrin more crystallites are added which can mimic fat crystals.

The low DE maltodextrin can, for example be prepared by debranching of the starches using pululanan or isoamyloase or by a combination of alpha amylase and debranching enzymes. Again it is understood that minor modification of the starch is part of the present invention.

According to a preferred embodiment of the invention, the composition according to the invention comprises amounts of the amylomaltase-treated amylopectin starch (a), the amylopectin starch (b) and the low DE maltodextrin (c) within the preferences indicated above and can be combined into any composition giving a total of 100 wt % of these three components.

For example, in one preferred embodiment of the invention, the starch composition comprises:
(a) between 5-90 wt % amylomaltase-treated starch
(b) between 10-95 wt % amylopectin starch
(c) between 0-60 wt % low DE maltodextrin
whereby wt % is wt % with relation to the total weight of components (a), (b), and (c).

The starch composition according to the invention can be produced by several methods, for example by blending, co-spray-drying, co-drum-drying, agglomerating and dry-mixing the ingredients.

In a second aspect of the invention, this invention relates the use of the novel starch composition in baked products, such as cakes. The composition according to the invention can be added in an amount of between 0.3 and 5 wt % to the recipe. Preferably, the amount added is between 0.5 and 2 wt %, more preferably between 0.7 and 1 wt %.

It is an object of the present invention to improve desired cake properties such as e.g. crumb structure and/or volume in regular cakes. It is another object of the present invention to enable reduction of the amount of fat in cake recipes, whilst at least maintaining desired cake properties, such as textural properties and mouthfeel.

Fats consist of a wide group of compounds that are generally soluble in organic solvents and largely insoluble in water. Chemically, fats are generally triesters of glycerol and fatty acids. Fats may be either solid or liquid at normal room temperature, depending on their structure and composition. Although the words "oils", "fats", and "lipids" are all used to refer to fats, "oils" is usually used to refer to fats that are liquids at normal room temperature, while "fats" is usually used to refer to fats that are solids at normal room temperature. "Lipids" is used to refer to both liquid and solid fats, along with other related substances (source: Wikipedia). In the present text the wording "fat" and "oil" are used interchangeably.

The present invention covers all types of cake, including shortened cakes, such as for example pound cake and butter cake, and including foam cakes, such as for example sponge cake, biscuit cake, roulade, genoise and chiffon cake.

The composition according to the invention can be used for replacing fat and it can also be used to increase the mouthfeel and texture of a non-fat cake such as a sponge cake. When using the composition according to the invention in a cake recipe, a cake is obtained with a smoother mouthfeel, whilst retaining a desired short bite.

Sponge cake is a type of soft cake based on wheat flour, sugar, and eggs (and optionally chemical leavening agents, milk components, emulsifiers, salts and, stabilizers). The only fat present is from the egg yolk, which is sometimes added separately from the white. It is often used as a base for other types of cakes and desserts. A basic sponge cake is made by beating the eggs with sugar until they are light and creamy, then carefully sieving and folding in the flour (which may be mixed with a small amount of baking powder, although the air incorporated into the egg mixture can be sufficient for a good rise). Sometimes, the yolks are beaten with the sugar first while the whites are beaten separately, to be mixed in later. The mixture is then poured into the chosen cake tin and baked. Before the mixture has cooled, after cooking, it is still flexible. This allows the creation of such varieties as the Swiss roll. This basic recipe is used for many treats and puddings, such as madeleines.

A pound cake is traditionally prepared of one pound each of wheat flour, butter/margarine, eggs, and sugar, optionally complemented with chemical leavening agents, milk components, emulsifiers, salts, and stabilizers.

In chiffon cake the butter/margarine has been replaced by oil. Sugar and egg yolk content has been decreased compared to pound or sponge cake and egg white content has been increased.

The reduction of the amount of fat which is possible according to the present invention differs per type of cake. The man skilled in the art knows the amount of fat which are regularly present in cake recipes.

In general a reduction of the amount of fat of at least 10% can be reached. More preferably a reduction of the amount of fat of at least 20% can be reached, even more preferably a reduction of at least 30% can be reached. It was shown that even a reduction of the amount of fat used of at least 50% can be reached. Surprisingly was found that use of the composition according to the invention, enables the baker to at least maintain batter viscosity, mouthfeel and texture of the cake.

The term at least maintaining is hereby used to indicate that a property is maintained or improved.

Measuring whether a property is maintained, improved or deteriorated in general is measured by preparing a batter and/or a cake in an original recipe, not containing the composition according to the invention and another batter and/or cake in a recipe containing the composition according to the invention and optionally less fat and comparing a certain property. In case the properties of both are substantially the same, the property is maintained, in case they differ either an improvement or a deterioration has taken place. For all mentioned properties below a measurement method has been given as well as an indication when a property can be considered as improved.

The batter viscosity can be measured with a Farinograph by standard methods according to the International Association of Cereal Chemistry (ICC) and the American Association of Cereal Chemistry (AACC 54-2, ICC 115).

Whether the batter viscosity has improved or deteriorated can for example be measured by comparing a batter prepared with the composition according to the invention, containing a reduced amount of fat, whereby the fat is replaced by weight by water and the composition according to the invention, to a batter prepared without the composition according to the invention containing a reduced amount of fat, whereby the fat is replaced by the same weight of water. In case the batter viscosity is the same for both batters, it has been maintained. In case the batter viscosity has increased, it has improved.

The specific density can be measured by weighing a predetermined volume of batter. The specific density is improved if it is decreased.

The crumb softness of the cake is evaluated either empirically by the skilled test baker or measured by the use of a texture analyzer (e.g., TAXT2) as known in the art. Actually crumb firmness is measured as is known to the person skilled in the art. The crumb softness measured within 24 hours after baking is called initial crumb softness. The crumb softness more than 24 hours after baking is called crumb softness upon storage, and is also a measure for determining shelf life. In case the initial crumb softness has increased, it has improved. In case the crumb softness upon storage has increased, it has improved.

Crumb pore homogeneity can be evaluated empirically by the skilled test baker or by digital image analysis as known in the art (e.g. C-cell, Calibre Control International Ltd, Appleton, Warrington, UK). In case the deviation in pore size is small, the crumb is called more homogeneous. In case the deviation in pore size has become smaller, the property is improved.

Crumb pore diameter can be evaluated using digital image analysis as known in the art (e.g. C-cell, Calibre Control International Ltd, Appleton, Warrington, UK). In case the average crumb pore diameter decreases, the property is improved. Preferably, this is the case when at the same time the same cake volume is maintained.

The shelf-life of the cake can be measured by determining the resilience of the cake in time. This is part of the method to measure crumb softness, as is known to the person skilled in the art, whereby the relaxation of the cake is also measured by the use of a texture analyzer (e.g., TAXT2, Stable Micro Systems Ltd, UK) as known in the art.

The volume of a given cake can be determined by an automated bread volume analyser (eg. BVM-3, TexVol Instruments AB, Viken, Sweden), using ultrasound or laser detection as known in the art. In case the volume is increased, the property is improved. Alternatively the cake height after baking in the same size tin is an indication of the cake volume. In case the cake height is increased, the cake volume has increased.

The emulsion stability of the batter can be determined by determining the cake height and visual analysis of the cake structure. In case the cake height has decreased, the emulsion stability of the batter has decreased. In case the cake structure is more dense, the emulsion stability of the batter also has decreased. In a third aspect the invention relates to a method to prepare a cake comprising the steps of:
  a. preparing the batter of the cake by adding at least:
   i. sugar,
   ii. flour,
   iii. egg, and
   iv. the composition according to the invention;
  b. putting the batter in a suitable baking mould; and
  c. baking the cake.

The ingredients of the composition according to the invention can be added to the batter separately or as a pre-mix.

According to the above-mentioned method both cakes comprising a reduced amount of fat and cakes where no fat reduction has been applied can be prepared.

In another aspect the invention relates to a method to prepare a batter of a cake comprising adding at least
  i. sugar,
  ii. flour,
  iii. egg, and
  iv. the starch composition according to the invention.

The ingredients of the composition according to the invention can be added to the batter separately or as a pre-mix.

There are several methods to combine cake ingredients, for example:
  Creaming method—butter and sugar are creamed together before the rest of the ingredients are gradually added.
  Melt-and-mix—dry ingredients are mixed together and then melted butter and other liquids are added to complete the cake.
  'All-in-together'—the dry ingredients and shortening are placed in the food processor and liquid is gradually added.
  Sponge cake production—eggs and sugar are whipped to a froth and flour is carefully mixed in. No fat is used in this method.

When all the cake ingredients are mixed, the mixture is called cake batter.

The composition according to the invention can be added during various stages of the cake production.

In one embodiment of the invention, the composition according to the invention is added during preparation of the batter.

In a preferred embodiment, which can be applied to all aspects of the invention, additionally at least one of the compounds selected from the group consisting of calcium, yeast extract, phosphilipase A, lipase and/or amyloglucosidase is combined with the composition according to the invention in the production of the cake.

The cake can either be a regular cake, i.e. a cake comprising a regular amount of fat, a cake comprising no fat, or a cake where the amount of fat in the recipe has been reduced. The man skilled in the art knows which amount of fat is present in regular cakes, which amount will be dependent on the type of cake.

Typical ingredients of the cake are wheat flour, egg and sugar. The egg phase may consist of whole egg or a mixture of egg white and egg yolk ranging from 0-100% of egg white and 100-0% of egg yolk. The egg product can be liquid or spray dried, can contain salt or sugar. Optionally, baking powder, salt, water, emulsifiers (such as for example PGE's and monoglycerides), margarine, butter and/or oil are added (for example for pound cakes and muffins). These ingredients can be part of the cake ingredients and/or the batter.

Also components to improve waterbinding such as hydrocolloids or modified starch can be used.

Optionally, flavouring agents such as vanilla extract, cocoa powder or yeast extracts can be added. An example of a suitable yeast extract is a yeast extract comprising at least 30% w/w 5' ribonucleotides on the basis of sodium free dry matter.

In a preferred embodiment of the invention, which can be applied to all the aspects of the invention, a yeast extract is used which comprises at least 30% w/w 5'-ribonucleotides, preferably at least 34% w/w, at least 38% w/w, at least 40% w/w or at least 42% w/w, more preferably at least 44% w/w, at least 46% w/w, at least 48% w/w or at least 50% w/w 5'-ribonucleotides on the basis of sodium chloride free dry matter. It has been found that the use of such yeast extract not only improves the taste of the cake, but also has a surprising emulsifying effect, since upon its use, the viscosity of the batter improves.

In the context of the present invention, the phrase "5'-ribonucleotides" refers to the total amount of 5'-monophosphate ribonucleotides formed during RNA degradation, viz.

5'-monophosphate guanine (5'-GMP), 5'-monophosphate uracil (5'-UMP), 5'-monophosphate cytosine (5'-CMP), 5'-monophosphate adenine (5'-AMP), where 5'-AMP may be partially or completely converted into 5'-monophosphate inosine (5'-IMP). For example, in a yeast extract which comprises 30% w/w 5'-ribonucleotides on the basis of sodium chloride free dry matter, the total amount of 5'-GMP, 5'-UMP, 5'-CMP, 5'-AMP and 5'-IMP is 30% w/w on the basis of sodium chloride free dry matter.

In a preferred embodiment, a yeast extract is used in the cake ingredients or the batter wherein the total amount of 5'-GMP plus 5'-IMP is at least 15% w/w, preferably at least 17% w/w, at least 19% w/w, at least 20% w/w or at least 21% w/w, more preferably at least 22% w/w, at least 23% w/w, at least 24% w/w or at least 25% w/w, on the basis of sodium chloride free dry matter. Due to the constitution of RNA, from which the 5'-ribonucleotides arise, 5'-GMP and 5'-IMP will always be present in approximately equal amounts in this embodiment.

In the context of the present invention, weight percentage calculations of the 5'-ribonucleotides are based on the disodium salt heptahydrate thereof unless otherwise specified. All percentages are calculated on sodium chloride free dry matter. In the present invention, the phrase 'sodium chloride free dry matter' refers to the fact that for the calculation of the weight percentage the weight of any sodium chloride present is excluded from the composition. The measurement of sodium chloride in the composition and the above-mentioned calculation can be performed by methods known to those skilled in the art. An example of yeast extracts comprising 40% w/w 5'-ribonucleotides of which 20% w/w 5'-GMP plus 5'-IMP, weight percentages being based on sodium chloride free yeast extract dry matter, is sold under the trademark Maxarite® Delite (DSM Food Specialties, The Netherlands).

The yeast extract may be prepared by any method which yields a yeast extract which comprises at least 30% w/w 5'-ribonucleotides on the basis of sodium chloride free dry matter.

The yeast extract may be obtained by hydrolysis or autolysis. Methods to produce hydrolytic yeast extracts are known in the art, see for example WO88/05267. In another embodiment, the yeast extract is obtained by autolysis, for instance as described in WO2005/067734.

It is possible to add additional enzymes to the cake ingredients. Examples of such enzymes are amylolytic enzymes like fungal alpha-amylase, bacterial amylases, anti-staling amylases (for example maltogenic alpha amylase), amyloglucosidases, lipolytic enzymes like lipases, galactolipases, proteolytic enzymes like endoproteases and exoproteases (carboxy- and aminopeptidases, redox enzymes (oxidases, etc.) and cross-linking enzymes (transglutaminase, etc).

In a preferred embodiment amyloglucosidase is added during the cake production process. Amyloglucosidase has been found to have a positive effect on the batter viscosity and resulting in a finer crumb structure. Furthermore, the amyloglucosidase has a sweetening effect on the taste of the cake.

In another preferred embodiment, which can be applied to all aspects of the invention, a lipolytic enzyme, for example a lipase or a phospholipase A is added during the cake production process. Surprisingly, it was found that adding an lipolytic enzyme increases the emulsion stability of the batter.

Examples of suitable lipolytic enzymes are Cakezyme™ (a phospholipase A2, available from DSM Food Specialties, The Netherlands), Bakezyme® L80,000 (a *R. oryzae* lipase, available from DSM Food Specialties, The Netherlands) or Lipopan® 50 (a *T. lanuginosis* lipase, available from Novozymes, Denmark). An additional advantage is that this enables reduction of chemical emulsifier components, such as mono- and or diglycerides (E471) and polyglycerol esters of fatty acids (E475). The lipase can be added in a dosage between 0.5-5 wt % per kg of flour.

In one embodiment of the invention, which can be applied to all aspects of the invention, the composition according to the invention and the optional additional ingredients are present in a cake mix. The ingredients of the starch composition according to the invention can be added to the ingredients of the cake mix separately or as a pre-mix. Cake mixes are often used at home because they are convenient. Most cake mixes simply require adding the package contents to eggs and oil in a bowl and mixing for two to three minutes. The mixture is then ready to be poured into baking tins and baked.

In a preferred embodiment of the invention, which can be applied to all aspects of the invention, additionally at least one of the compounds selected from the group consisting of calcium, yeast extract, hydrocolloids, phospholipase A2, lipase and/or amyloglucosidase is used or added to the batter in combination with the composition according to the invention. Also a combination of any one of these compounds is possible. The cake according to the invention is very similar to the reference but containing much less calories per unit of weight.

Example 1

Pound cakes were prepared from 600 g whole liquid eggs, 600 g butter (high fat) or 420 g butter plus 160 or 180 gram of water (reduced fat cakes), 1200 g commercial cake mix (Damco), 7.5 g salt, 3.6 g calcium propionate and 20 gram mixtures of starches: starch mix A contained only amylomaltase treated starch, starch mix B contained 1 part amylomaltase treated starch, 5 parts amylopectin starch and 4 parts low DE maltodextrin.

The butter was melted by mixing in a Hobart provided with a flat beater mixer during 2 minutes at speed 2. Then all other ingredients except the starch mixes were added and mixed for 4 minute at speed 1. After the starch mix was added, mixed 2 minutes at speed 1 and 2 minutes at speed 2. Cake pans were filled with 420 g batter and baked for 60 minutes at 150/155° C. Batter viscosities of the low fat product without extra starch was unacceptably low, with the starch mixtures this was lower than the reference but still acceptable.

Cake height was measured in the middle of cake. Cake height of the reference was defined as 100%. The height of the products with starch mixes was comparable to the reference, the low fat product without starch mix had a substantially lower height. Crumb firmness and elasticity were measured on 2 slices cut in the middle of cake having a thickness of 2.0 cm with use of a texture analyzer using a procedure known in the art. Results are shown in Table 1; sample 1 is the full fat reference, sample 2 a reduced fat product with starch mix A, sample 3 with starch mix B and sample 4 the reduced fat cake without extra starch mix.

TABLE 1

Effect of starch mixes on pound cake firmness and elasticity with 30% fat reduction

| | Reduction Fat % | Water gram | Starch mix A | Starch mix B | Firmness after 1 week | Firmness after 2 weeks | Firmness after 4 weeks | Elasticity after 1 week | Elasticity after 2 weeks | Elasticity after 4 weeks |
|---|---|---|---|---|---|---|---|---|---|---|
| 1 | | | | | 100% | 100% | 100% | 100% | 100% | 100% |
| 2 | 30 | 161 | 19.2 | | 106% | 100% | 90% | 110% | 109% | 109% |
| 3 | 30 | 160 | | 19.2 | 90% | 96% | 80% | 110% | 106% | 108% |
| 4 | 30 | 180 | | | 102% | 103% | 81% | 112% | 110% | 109% |

The cakes were assessed sensorially by a small panel of experts. The reference (sample 1) was considered the driest with a dry and yet fatty mouthfeel. The low fat reference without further starch addition (sample 4) was least creamy, more watery. With the starches (samples 2 and 3) a rich and moist, more coherent texture was observed. Within these two, sample 3 was the more preferred one for its even creamier mouthfeel that was left even after one month. Moreover softness of this product (sample 3) improves over one month relatively compared to the reference.

Example 2

In another experiment pound cakes were made in the same way as given in example 1, however now in slightly different compositions containing also extra lipase (Cakezyme™, DSM Food Specialties, Delft, the Netherlands) as given in the table below and starch mix C is a mixture of 1 part of amylomaltase treated starch and 1 part high amylopectin starch. Starch mix A and starch mix B are the same as in Example 1.

TABLE 2

| | reference 1 | Only lipase 2 | Lipase + A 3 | Lipase + B 4 | Lipase + C 5 |
|---|---|---|---|---|---|
| Eggs Fresh | 24.9 | 19.9 | 19.9 | 19.9 | 19.9 |
| Water | | 5 | 11.6 | 11.6 | 11.6 |
| Damco cake mix | 49.8 | 49.8 | 49.8 | 49.8 | 49.8 |
| Salt | 0.3 | 0.3 | 0.3 | 0.3 | 0.3 |
| Butter | 24.9 | 24.9 | 17.4 | 17.4 | 17.4 |
| Cakezyme | | 0.04 | 0.04 | 0.04 | 0.04 |
| Starch mix A | | | 0.8 | | |
| Starch mix B | | | | 0.8 | |
| Starch mix C | | | | | 0.8 |
| Results | | | | | |
| Batter RVA viscosity (Pa·s) | 20.9 | 16 | 9.6 | 8.3 | 9.2 |
| Sensory | | | | | |
| Dry - moist | 19 | 34 | 38 | 40 | 40 |
| Smooth, creamy, vivid | 29 | 32 | 40 | 33 | 43 |
| Hardness "1st bite" | 44 | 29 | 37 | 25 | 25 |

Batter viscosity was measured using a rapid visco analyser (RVA) while stirring at standard speed for 5 minutes at 20° C. The initial viscosity was taken as a measure of batter viscosity, given in the last line of the above table, a value with a margin of at least 1 Pa·s. Cake batter viscosities are dominated by the high water content, but within the starch series no substantial differences were seen.

These cakes were subjected to a sensorial evaluation. 42 untrained average-tasting people participated in the test. Each person received three products out of the five variants and was asked to rank them on a) dry-moist, b) 'Smeuïg' which stands for smooth, creamy and vivid, and c) hardness at first bite. Scores were summed and results were analysed statistically. Only when a difference is more than 11.5 points this difference is statistically significant. In table 2 the scores are given.

Scores on the attribute 'dry ↔ moist' represent the same as the attribute 'smooth, vivid, creamy' but when a product becomes too moist, it is not smooth, vivid, creamy anymore, it becomes sticky and difficult to swallow. Therefore both attributes represent different sensorial aspects. These indicate that the reference product is significantly drier than all the others. In the attribute Smooth-Creamy-Vivid differs only significantly between reference and starch mix B+lipase (sample nr 4), and near-significant between reference and starch mix A and lipase (sample nr 3). On this attribute other differences are smaller and hence further away from significance.

The attribute 'Hardness at first bite' shows significant differences between reference (sample nr 1) with starch mix B+lipase (sample nr 4) and only lipase (sample nr 2).

Overall it is clear that the product with starch mix B has the best sensorial performance especially in the attribute creaminess.

The invention claimed is:

1. A starch composition comprising:
   (a) at least 5 weight percent and at most 30 weight percent of amylomaltase-treated starch;
   (b) at least 30 weight percent and at most 70 weight percent of amylopectin starch; and
   (c) at least 6 weight percent and at most 60 weight percent of low DE maltodextrin,
   wherein said weight percent are in relation to the total weight of (a), (b), and (c), wherein said starch composition is obtained by mixing (a), (b), and (c).

2. The composition according to claim 1, wherein the amylomaltase-treated starch is potato-starch.

3. The composition according to claim 1, wherein the amylopectin starch is potato-starch.

4. The composition according to claim 1, wherein the amylopectin starch (b) is pregelatinized.

5. A method to produce the starch composition according to claim 1 comprising mixing
   (a) at least 5 weight percent and at most 30 weight percent of amylomaltase-treated starch; with
   (b) at least 30 weight percent and at most 70 weight percent of amylopectin starch; and
   (c) optionally, at least 6 weight percent and at most 60 weight percent of low DE maltodextrin,
   to form the starch composition.

6. The method according to claim 5, wherein the amylomaltase-treated starch is potato-starch.

7. The method according to claim 5, wherein the amylopectin starch is potato-starch.

8. The method according to claim 5, wherein the amylopectin starch (b) is pregelatinized.

9. A method to prepare a cake comprising the steps of:
(a) preparing the batter of the cake by adding at least:
  i. sugar,
  ii. flour,
  iii. egg, and
  iv. the composition according to claim 1
(b) putting the batter in a suitable baking mould; and
(c) baking the cake.

10. The method according to claim 9 wherein the batter additionally comprises a yeast extract.

11. The method according to claim 10 wherein the yeast extract comprises 30% w/w 5'-ribonucleotides on the basis of sodium chloride free yeast extract dry matter and wherein the total amount of 5'-GMP plus 5'-IMP in the yeast extract is at least 15% w/w on the basis of sodium chloride free yeast extract dry matter.

12. The method according to claim 9 wherein the batter additionally comprises a lipolytic enzyme.

13. A cake obtainable by the method according to claim 9.

14. The starch composition according to claim 1, wherein said starch composition comprises at least 6 weight percent and at most 40 weight percent of low DE maltodextrin.

15. The starch composition according to claim 1, wherein said starch composition comprises at least 5 percent and at most 20 weight percent of amylomaltase-treated starch.

16. The starch composition according to claim 1, wherein said starch composition comprises at least 30 weight percent and at most 60 weight percent of amylopectin starch.

17. A composition comprising the starch composition according to claim 1 and an ingredient selected from the group consisting of sugar, flour, egg, and yeast extract.

18. The method according to claim 9, wherein the amount of fat in said cake is reduced.

19. A starch composition comprising:
(a) at least 5 weight percent and at most 90 weight percent of amylomaltase-treated starch;
(b) at least 10 weight percent and at most 95 weight percent of amylopectin starch; and
(c) optionally, at least 6 weight percent and at most 60 weight percent of low DE maltodextrin,
wherein said weight percent are in relation to the total weight of (a), (b), and (c), wherein said starch composition is obtained by mixing (a), (b), and (c).

20. A starch composition comprising:
(a) at least 5 weight percent and at most 90 weight percent of amylomaltase-treated starch;
(b) at least 10 weight percent and at most 95 weight percent of amylopectin starch added to said amylomaltase-treated starch; and
(c) optionally, at least 6 weight percent and at most 60 weight percent of low DE maltodextrin,
wherein said weight percent are in relation to the total weight of (a), (b), and (c), wherein said starch composition is obtained by mixing (a), (b), and (c).

* * * * *